(12) United States Patent
Lee

(10) Patent No.: US 7,630,051 B2
(45) Date of Patent: Dec. 8, 2009

(54) LCD PANEL AND METHOD HAVING COLOR FILTER AND SMOOTHING LAYERS OVERLAPPING BLACK MATRIX AND FIRST TO THIRD SPACERS IN NON-ACTIVE AREA WHERE THE SPACERS ARE DISPOSED ON THE SMOOTHING LAYER AT PROGRESSIVELY INCREASING DISTANCES FROM SUBSTRATE SEAL

(75) Inventor: Min Jic Lee, Daegu (KR)

(73) Assignee: LG Display Co., Ltd., Seoul (KR)

( * ) Notice: Subject to any disclaimer, the term of this patent is extended or adjusted under 35 U.S.C. 154(b) by 224 days.

(21) Appl. No.: 11/304,534

(22) Filed: Dec. 16, 2005

(65) Prior Publication Data
US 2006/0262265 A1 Nov. 23, 2006

(30) Foreign Application Priority Data
May 18, 2005 (KR) .............................. 2005-041839

(51) Int. Cl.
*G02F 1/1339* (2006.01)
(52) U.S. Cl. ..................................... 349/155; 349/157
(58) Field of Classification Search .......... 349/155–157
See application file for complete search history.

(56) References Cited

U.S. PATENT DOCUMENTS

| | | | |
|---|---|---|---|
| 7,088,418 B1 * | 8/2006 | Yamashita et al. | 349/153 |
| 2002/0171800 A1 * | 11/2002 | Miyazaki et al. | 349/156 |
| 2003/0076471 A1 * | 4/2003 | Yanagawa et al. | 349/155 |

* cited by examiner

*Primary Examiner*—John Heyman
(74) *Attorney, Agent, or Firm*—McKenna Long & Aldridge

(57) ABSTRACT

A liquid crystal display panel and a fabricating method thereof for preventing a generation of stains caused by a cell gap difference between an active area and an outside area are disclosed. In the liquid crystal display panel, an adhesive is placed between an upper substrate and a lower substrate that are closed in such a manner as to join an upper substrate from a lower substrate. A liquid crystal layer is provided at a closed area defined by the adhesive by a dropping system. A first pattern spacer is positioned at an active area between the upper substrate and the lower substrate. A second pattern spacer is provided such that an outside area thereof enclosing said active area has a different arrangement density from the first pattern spacer and is provided at the same plane as the first pattern spacer.

7 Claims, 6 Drawing Sheets

LCD PANEL AND METHOD HAVING COLOR FILTER AND SMOOTHING LAYERS OVERLAPPING BLACK MATRIX AND FIRST TO THIRD SPACERS IN NON-ACTIVE AREA WHERE THE SPACERS ARE DISPOSED ON THE SMOOTHING LAYER AT PROGRESSIVELY INCREASING DISTANCES FROM SUBSTRATE SEAL

This application claims the benefit of Korean Patent Application No. P2005-41839 filed in Korea on May 18, 2005, which is hereby incorporated by reference for all purposes as if fully set forth herein.

BACKGROUND OF THE INVENTION

1. Field of the Invention

The present invention relates to a liquid crystal display panel, and more particularly to a liquid crystal display panel and a fabricating method thereof that are adaptive for preventing a generation of stains caused by a cell gap difference between an active area and an outside area.

2. Description of the Related Art

A liquid crystal display device controls light transmittance of a liquid crystal using an electric field in order to display a picture. As illustrated in FIG. 1, the liquid crystal display device includes a thin film transistor substrate 70 and a color filter substrate 80 that are opposed to each other with having a liquid crystal layer 16 therebetween.

In the color filter substrate 80, a color filter array including a black matrix 18 for preventing light leakage, a color filter 12 for implementing a color, a common electrode 14 forming a vertical electric field along with a pixel electrode 22 and an upper alignment film coated thereon to align the liquid crystal is provided on an upper substrate 11.

In the thin film transistor substrate 70, a thin film transistor array including a gate line 2 and a data line 4 crossing each other, a thin film transistor 30 formed at an intersection thereof, a pixel electrode 22 connected to the thin film transistor 30 and a lower alignment film coated thereon to align the liquid crystal is provided on a lower substrate 1.

In a related art liquid crystal display device, the liquid crystal layer 16 is provided between the thin film transistor substrate 70 and the color filter substrate 80 by a dropping system. More specifically, the liquid crystal is dropped into a closed area defined by an adhesive coated onto any at least one of the thin film transistor substrate 70 and the color filter substrate 80 to thereby provide the liquid crystal layer 16. Then, the thin film transistor substrate 70 and color filter substrates 80 undergo a vacuum joining with having the liquid crystal layer 16 therebetween, thereby completing the liquid crystal display panel.

After the vacuum joining of the thin film transistor substrate 70 and color filter substrates 80, the exterior of the liquid crystal display panel returns to atmospheric pressure with the liquid crystal layer 16 being not filled uniformly until the outside area encloses the active area. Then, the outside area of the liquid crystal display panel, that is, an area adjacent to the adhesive 20 becomes a vacuum to receive high pressure from the exterior thereof, thereby causing a twisting of the substrate. Further, as illustrated FIG. 2, the color filter 12 is not provided at the outside area. In this case, a main pattern spacer 26 positioned at the active area is in contact with the thin film transistor substrate 70, whereas a dummy pattern spacer 24 positioned at the outside area is not in contact with the thin film transistor substrate 70. Thus, a problem such that a twisting of the substrate differentiates a cell gap of the active area from that of the outside area, causing stains.

SUMMARY OF THE INVENTION

Accordingly, it is an advantage of the present invention to provide a liquid crystal display panel and a fabricating method thereof that are adaptive for preventing stains caused by a cell gap difference between an active area and an outside area.

In order to achieve these and other advantages of the invention, the liquid crystal display panel according to the present invention includes: an adhesive formed in such a manner to have a closing type between an upper substrate and a lower substrate and unites the upper substrate and the lower substrate; a liquid crystal layer is formed in a dropping type at the closed area arranged by the adhesive; a first pattern spacer positioned at the active area of between the upper substrate and the lower substrate; a second pattern spacer formed differently an arrangement density in comparison to the first pattern spacer positioned at the outside area enclosing the active area and is formed on the same plane along with the first pattern spacer.

In the liquid crystal display panel, said second pattern spacer has a higher arrangement density that the first pattern spacer as it goes around said adhesive.

The liquid crystal display panel further comprises a black matrix provided on the upper substrate and a color filter provided at the active area and the outside area on the black matrix.

The liquid crystal display panel further comprises a smoothing layer provided at the active area and the outside area to cover the color filter.

In the liquid crystal display panel, said first and second pattern spacers are provided on the color filter.

In the liquid crystal display panel, said first and second pattern spacers are provided on the smoothing layer.

The second pattern spacer is having a higher arrangement density as approaching to the adhesive in comparison to the first pattern spacer.

The liquid crystal display panel includes: the black matrix formed on the upper substrate; a color filter formed at the active area and outside area of the black matrix.

The liquid crystal display panel includes: a flattening layer formed at the active area and outside area for covering the color filter.

The first and second pattern spacers are formed on the color filter.

The first and second pattern spacers are formed on the flattening layer.

A method of fabricating the liquid crystal display panel according to the present invention includes: preparing a first substrate; preparing a second substrate facing the first substrate including a second pattern spacer formed differently an arrangement density in comparison to a first pattern spacer positioned at the outside area enclosing the active area and formed on the same plane along with the first pattern spacer; forming an adhesive in a closing type on at least one of the first substrate and second substrates; dropping a liquid crystal at the closed area arranged by the adhesive; uniting the first and second substrates together employing the adhesive with the liquid crystal therebetween.

In the method, the step of preparing the second substrate includes simultaneously forming the first pattern spacer and the second pattern spacer with a higher arrangement density than the first pattern spacer as it goes around the adhesive on the second substrate.

The method further includes the steps of forming a black matrix on any one of the first substrate and second substrates; and forming the color filter at the active area and the outside area on the black matrix.

The method further comprises the step of forming a smoothing layer at the active area and the outside area to cover the color filter.

In the method, said first and second pattern spacers are formed on the color filter.

In the method, said first and second pattern spacers are formed on the smoothing layer.

In the method, said first and second pattern spacers are formed by a photolithography.

The step of preparing the second substrate includes: forming simultaneously a first pattern spacer, and a second pattern spacer having a higher arrangement density in comparison to the first pattern spacer as approaching to the first pattern spacer and the adhesive on the second substrate.

The method further comprises the step of forming a black matrix on any one of the first substrate and second substrates; forming a color filter at the active area and the outside area of the black matrix.

The method further comprises the step of forming a flattening layer formed at the active area and the outside area for covering the color filter.

The first and second pattern spacers are formed by a photolithography process.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE ILLUSTRATED EMBODIMENTS

Examples of embodiments of the present invention will now be described with reference to the drawings. Hereinafter, the exemplary embodiment of the present invention will be described in detail with reference to FIG. 3 to FIG. 5b.

Figure 1:
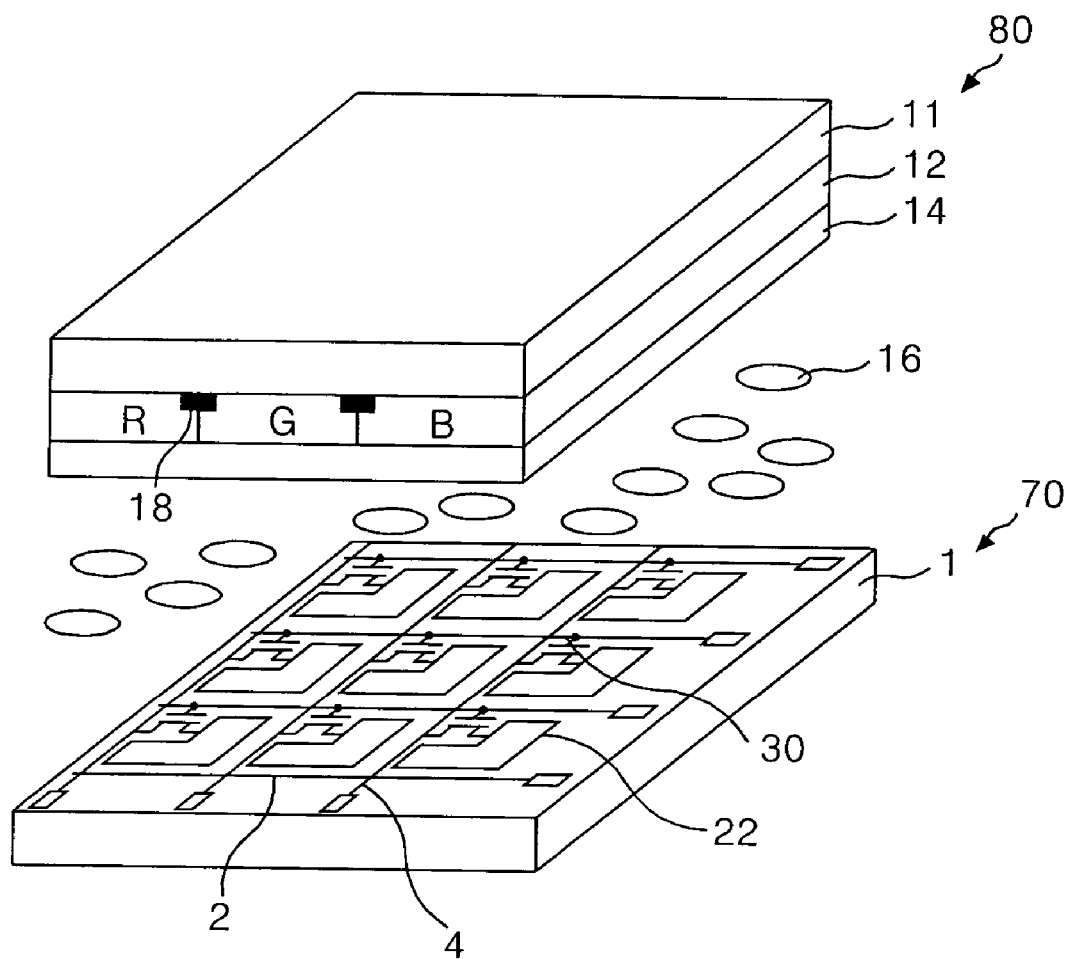
FIG. 1 is a perspective view illustrating a structure of a related art liquid crystal display panel.
Figure 2:
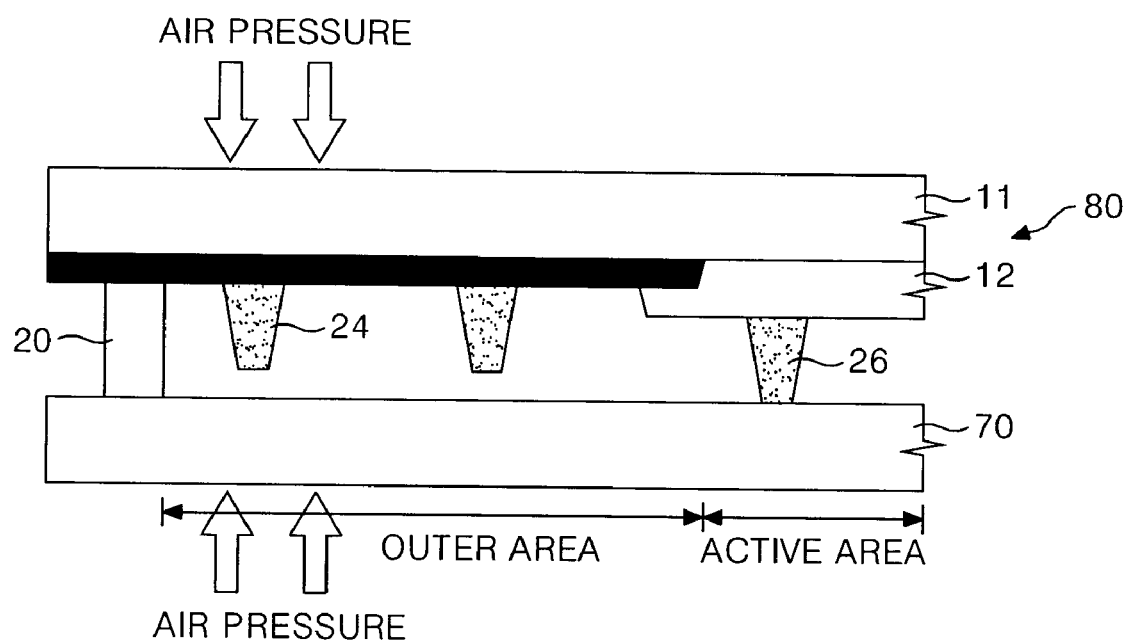
FIG. 2 is a detailed section view of a spacer of the related art liquid crystal display panel.
Figure 3:
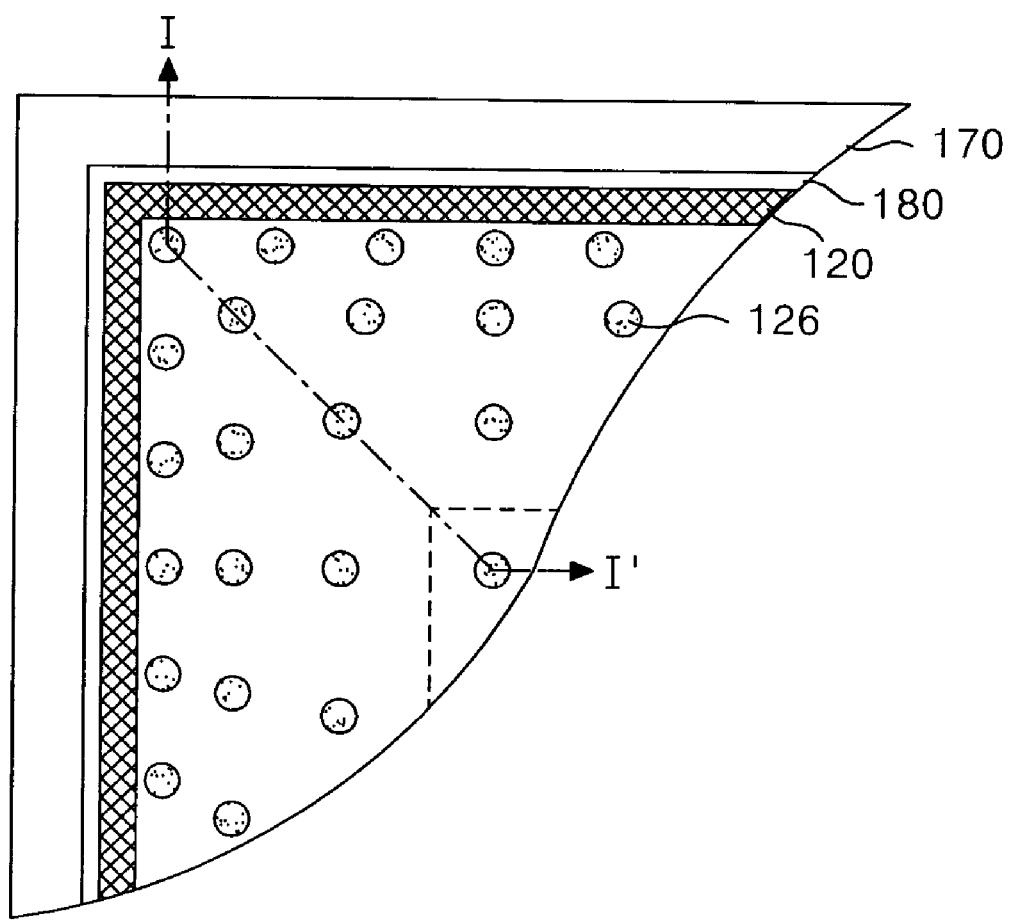
FIG. 3 is a plan view illustrating a structure of a liquid crystal display panel according to an embodiment of the present invention.
Figure 4:
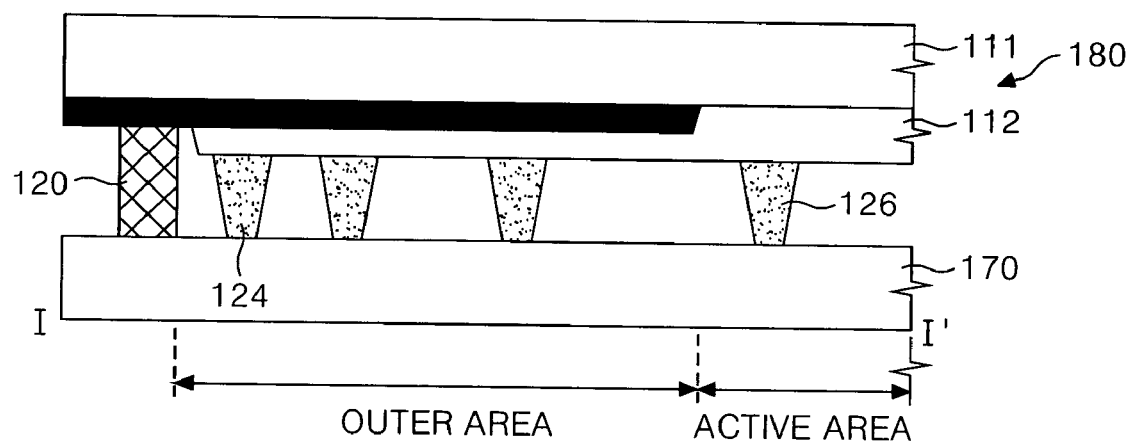
FIG. 4 is a section view of the liquid crystal display panel taken along the I-I' line in FIG. 3.

FIG. 3 is a plan view illustrating a structure of the liquid crystal display panel according to an embodiment of the present invention, and FIG. 4 is a section view of the liquid crystal display panel taken along the I-I' line in FIG. 3.

Referring to FIG. 3 and FIG. 4, the liquid crystal display penal includes pattern spacers 124 and 126, and a thin film transistor substrate 170 and a color filter substrate 180 opposed to each other with having the pattern spacers 124 and 126 therebetween.

In the thin film transistor substrate 170, a thin film transistor array including a gate line and a data line crossing each other, a thin film transistor formed at an intersection thereof, a pixel electrode 22 connected to the thin film transistor and a lower alignment film coated thereon to align the liquid crystal is provided on a lower substrate.

In the color filter substrate 180, a color filter array including a black matrix 118 for preventing light leakage, a color filter 112 for implementing a color, a common electrode (not illustrated) forming a vertical electric field along with a pixel electrode and an upper alignment film coated thereon to align the liquid crystal is provided on an upper substrate 111. Further, in the color filter substrate 180, a smoothing layer (not illustrated) for smoothing the upper substrate 111 stepped by the color filter may be provided on the upper substrate 111.

At least one of the color filter 112 and the smoothing layer is extended to the active area as well as the outside area. The main pattern spacer 126 and the dummy pattern spacer 124 are formed on any one of the color filter 112 and the smoothing layer extended into the outside area. As mentioned above, the pattern spacer 126 and the dummy pattern spacer 124 compensate for the step coverage between them on the same plane.

The pattern spacer includes the main pattern spacer 126 positioned at the active area and the dummy pattern spacer 124 positioned at the outside area.

The main pattern spacer 126 plays a role to keep the cell gap between the thin film transistor substrate 170 and the color filter substrate 180. The main pattern spacer 126 is formed by patterning an organic insulating material such as acrylic group resin by the photolithography and the etching process.

The dummy pattern spacer 124 is formed from the same material and on the same plane as the main pattern spacer 126. The dummy pattern spacer 124 has a different arrangement density from the main pattern spacer 126. In other words, the dummy pattern spacer 126 has a constant arrangement density irrespectively of its position, whereas the dummy pattern spacer 124 has a higher arrangement density as it goes around an adhesive 120. Thus, when the interior of the panel is a vacuum state after the joining process, the outside area can stand an external pressure by the dummy pattern spacer 124 having a high arrangement density. Accordingly, it becomes possible to prevent a twisting of the substrate. Also, the active area and the outside area have the same cell gap, so that it becomes possible to prevent cell gap badness.

Figure 5A:
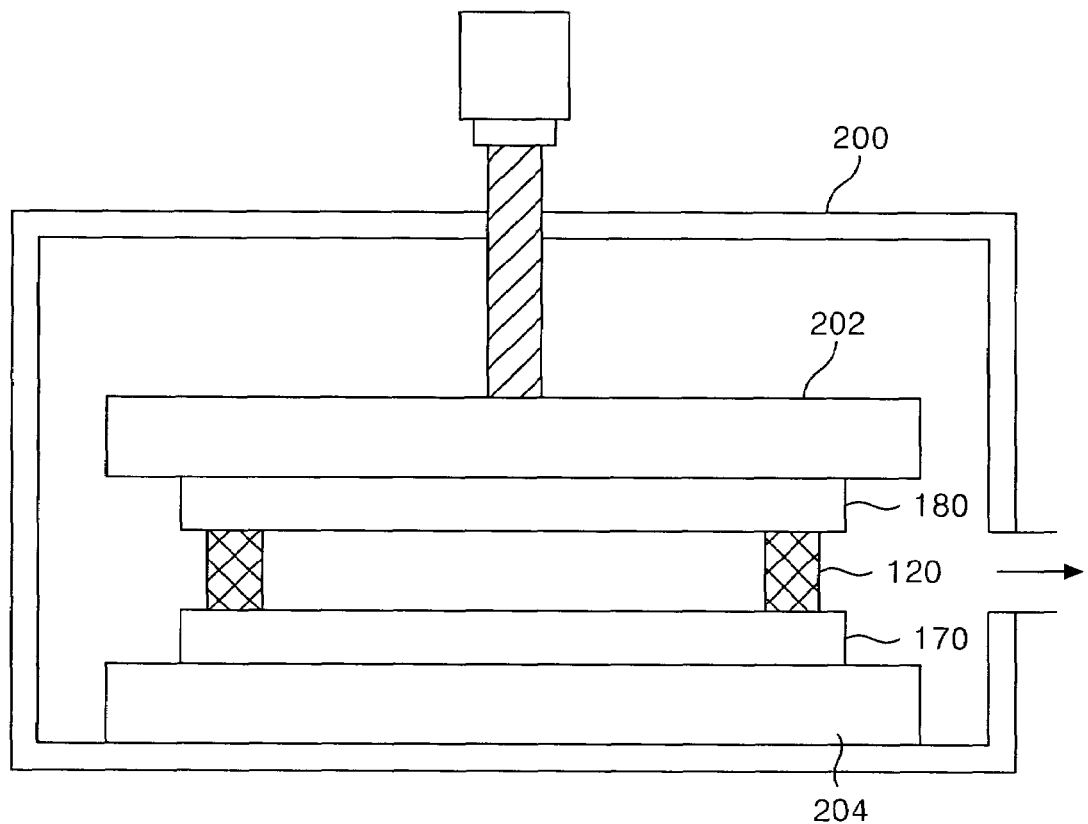
FIG. 5a and FIG. 5b are a section view and a plan view for explaining a method of fabricating the liquid crystal display panel according to the embodiment of the present invention, respectively.
Figure 5A:
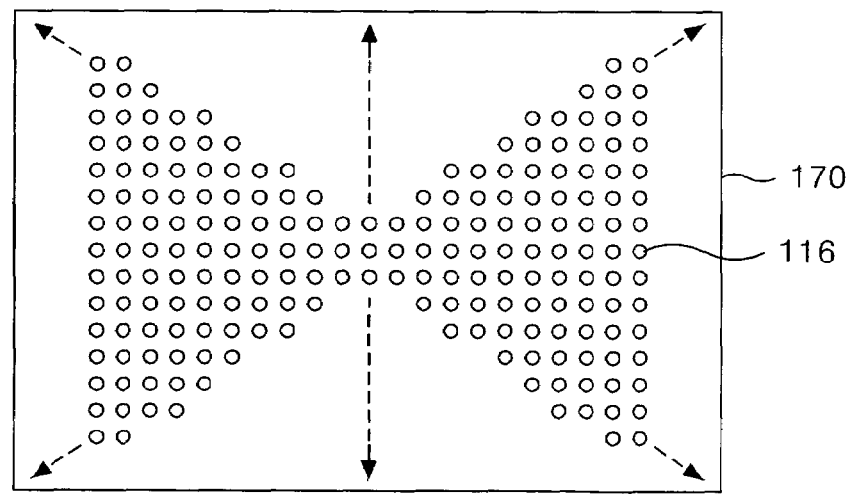
Figure 5B:
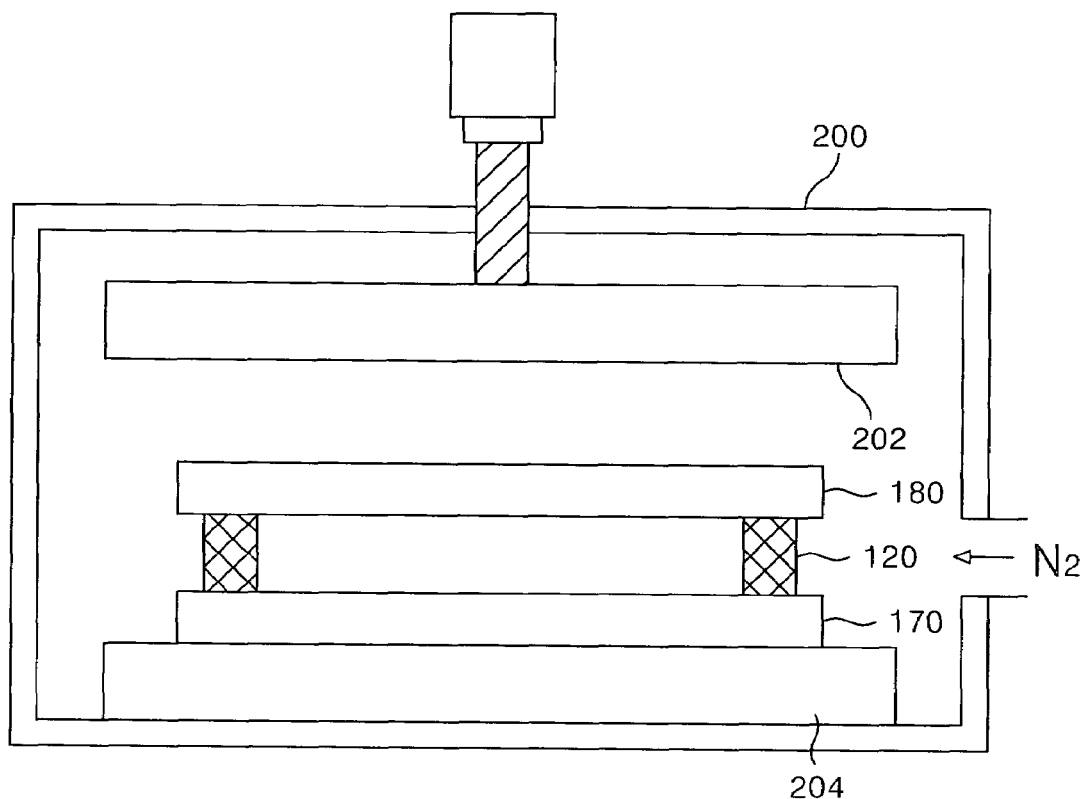
Figure 5B:
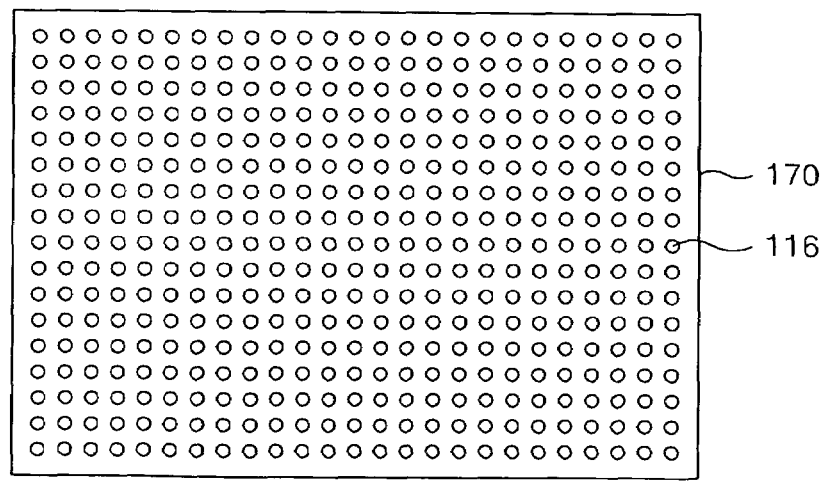

FIG. 5a and FIG. 5b are views illustrating a method of fabricating the liquid crystal display panel having the main pattern spacer and the dummy pattern spacer according to the present invention.

As illustrated FIG. 5a, the color filter substrate 180 and the thin film transistor substrate 170 are loaded on upper/lower stages 202 and 204. The adhesive is coated onto the thin film transistor substrate 170 loaded on the lower stage 204 in a closed manner. The liquid crystal 116 is dropped into the closed area defined by the adhesive. In this case, since the liquid crystal 10 has spreads in the vertical direction farther than it spreads in the diagonal direction; it is dropped lengthwise onto the edge of the substrate. In other words, as it goes from the middle area of the substrate into each side area thereof, a dropped area of the liquid crystal 116 is more enlarged. After the liquid crystal 116 is dropped, the upper stage 202 is fallen. Thus, while two substrates 180 and 170 are being pressurized by the upper stage 202, the color filter substrate 180 and the thin film transistor substrate 170 are joined to each other.

Thereafter, as illustrated FIG. 5b, the upper stage 202 is raised to separate the upper stage 202 from the joined two substrates 180 and 170. Then, in order to raise a vacuum chamber 200 to atmospheric pressure and to uniformly pressurize the joined color filter substrate and thin film transistor substrate 180 and 170, a gas such as $N_2$ is applied to the vacuum chamber 200. If the gas is applied, then an area between the color filter substrate 180 and the thin film transistor substrate joined by the adhesive becomes a vacuum state while the vacuum chamber becomes the atmosphere state. Accordingly, a uniform pressure is applied such that the color filter substrate 180 and the thin film transistor substrate 170 converted into the vacuum state by the atmosphere pressure can keep a uniform gap. In this case, as illustrated FIG. 5a and FIG. 5b, the liquid crystal 116 is uniformly spread out into the closed area caused by the adhesive 120.

As described above, according to the present invention, the dummy pattern spacer positioned at the outside area has a higher arrangement density than the main pattern spacer positioned at the active area. Accordingly, when the interior of the panel goes into a vacuum state after the joining process, the outside area can stand an external pressure with the aid of the dummy pattern spacer 124. Accordingly, it becomes possible to prevent a twisting of the substrate. Furthermore, the active area and the outside area have the same cell gap, so that it becomes possible to prevent cell gap badness.

Although the present invention has been explained by the embodiments illustrated in the drawings described above, it should be understood to the ordinary skilled person in the art that the invention is not limited to the embodiments, but rather that various changes or modifications thereof are possible without departing from the sprit of the invention.

What is claimed is:

1. A liquid crystal display panel, comprising:
    an adhesive between an upper substrate and a lower substrate joining an upper substrate with a lower substrate;
    a liquid crystal layer provided at a closed area defined by the adhesive by a dropping system;
    a first pattern spacer positioned at an active area between the upper substrate and the lower substrate;
    a black matrix provided on the upper substrate;
    a color filter provided at the active area and an outside area thereof enclosing the active area on the black matrix;
    a smoothing layer provided at the active area and the outside area to cover the color filter; and
    a second pattern spacer provided such that the outside area has a different arrangement density from the first pattern spacer and provided at the same plane as the first pattern spacer,
    wherein the second pattern spacer includes at least first to third spacers arranged between the adhesive and the active area, and provided on the smoothing layer such that the first to third spacers are overlapped with the color filter,
    the first spacer is spaced apart from the adhesive by a first distance,
    the second spacer is spaced apart from the first spacer by a second distance which is longer than the first distance,
    the third spacer is spaced apart from the second spacer by a third distance which is longer than the second distance, and
    the second pattern spacer has a higher arrangement density than the first pattern spacer as it goes around said adhesive.

2. In the liquid crystal display panel as claimed in claim 1, wherein said first pattern spacer is provided on the color filter.

3. In the liquid crystal display panel as claimed in claim 1, wherein said first pattern spacer is provided on the smoothing layer.

4. A method of fabricating a liquid crystal display panel, comprising:
    preparing a first substrate;
    preparing a second substrate opposed to the first substrate and having a black matrix and a color filter provided at an active area and an outside area thereof enclosing the active area on the black matrix, a smoothing layer provided at the active area and the outside area to cover the color filter, a first pattern spacer provided on the active area, and a second pattern spacer provided at the outside area in such a manner to have a different arrangement density from the first pattern spacer and provided on the same plane as the first pattern spacer;
    forming an adhesive on any at least one of the first substrate and second substrates in a closed manner;
    dropping a liquid crystal into the closed area defined by the adhesive; and
    joining the first and second substrates to each other with the liquid crystal therebetween by the adhesive,
    wherein said step of preparing the second substrate includes:
    simultaneously forming the first pattern spacer and the second pattern spacer with a higher arrangement density than the first pattern spacer as it goes around the adhesive on the second substrate,
    wherein the second pattern spacer includes at least first to third spacers arranged between the adhesive and the active area and provided on the smoothing layer such that the first to third spacers are overlapped with the color filter,
    wherein the first spacer is spaced apart from the adhesive by a first distance,
    the second spacer is spaced apart from the first spacer by a second distance which is longer than the first distance, and
    the third spacer is spaced apart from the second spacer by a third distance which is longer than the second distance.

5. The method as claimed in claim 4, wherein said first pattern spacer is formed on the color filter.

6. The method as claimed in claim 4, wherein said first pattern spacer is formed on the smoothing layer.

7. The method as claimed in claim 4, said first and second pattern spacers are formed by a photolithography.

* * * * *